Patented May 4, 1943

2,318,573

UNITED STATES PATENT OFFICE 2,318,573

MANUFACTURE OF CELLULOSE ESTERS

Carl J. Malm, Rochester, N. Y., assignor to Eastman Kodak Company, Rochester, N. Y., a corporation of New Jersey No Drawing. Application October 12, 1939, Serial No. 299,148

5 Claims. (Cl. 260—229)

This invention relates to a method of preparing an esterification vessel for use for the esterification of cellulose after it has been previously employed for that purpose.

In my Patent No. 2,121,808, I recognized that an esterification vessel, such as a mixer, did not need to be cleaned out before its use for a subsequent esterification if the effect of the catalyst therein from a previous batch is taken care of. I there found that the addition of an alkali metal salt in an amount to give a pH of 0.5–1.5 in the activating liquid would neutralize the effect of the catalyst.

I have now found that by incorporating a neutralizing agent which forms a sulfate insoluble in glacial acetic acid, the control work necessary, if alkali metal salts are used to neutralize the sulfuric acid in the presoaking, is eliminated. I have found that with neutralizing agents giving a sulfate insoluble in the esterification mixture that the addition of a slight excess of the neutralizing agent to the presoaking liquid, is not detrimental to the esterification process as it does not influence the reaction or the stability of the product. Whereas, previously with alkali metal salts it has been necessary to run tests with every batch to determine the amount of alkali metal salt which should be added, I have found that with the neutralizing agents featured herein the running of tests is unnecessary as the presence of a slight excess of neutralizing agent is not detrimental to the esterification process. Therefore, in a series of like esterifications, the same amount of neutralizing agent in accordance with my invention can be added for each subsequent batch without detrimentally affecting the product. Knowing the proportion of sulfuric acid employed in an esterification, the amount of neutralizing agent, in accordance with my invention, to be added to a subsequent batch can be standard and the running of tests is unnecessary.

In the making of high viscosity cellulose esters such as cellulose acetate or cellulose acetate propionate or acetate-butyrate, it is desirable to presoak the cellulose with a bath free of sulfuric acid but containing a considerable amount of lower fatty acid, usually principally acetic acid, prior to the esterification. This presoaking activates the cellulose or in other words, renders it readily susceptible to esterification thus avoiding the degradation which occurs in a slowly reacting esterification mass. If sulfuric acid is present in the presoaking, the viscosity of the cellulose is reduced, thereby preventing the formation of a high viscosity ester. The neutralizing agents in accordance with my invention, even if present in an amount only approximately that which will neutralize the sulfuric acid in the presoaking bath, (such as in slight excess) the sulfuric acid catalyst in the esterification proper is not buffered thereby, and the reaction proceeds at a rate whereby the viscosity of the cellulose is not appreciably lowered.

Examples of processes in which my invention is useful are those described in my Patent No. 2,026,986 of January 7, 1936. My invention, however, includes both processes of making the mixed esters of cellulose and cellulose acetate. Ordinarily after the esterification is completed, the viscous solution is removed from the mixer or esterification vessel by dumping it into a vessel wherein the hydrolysis can take place. When this dumping occurs, some of the esterification mixture cannot be removed from the mixer and therefore becomes mixed with the following batch. It is to overcoming any detrimental effect from this spent reaction mixture that my invention is directed. My invention is also applicable, however, to cases where the hydrolysis has been carried out in the esterification vessel, as after the removal of the solution there is still in that case also a residual portion adhering to the walls of the vessel.

After the solution has been emptied from the mixer, the amount of activating liquid for a subsequent batch is placed therein, which liquid essentially consists of lower fatty acid, and approximately the amount of neutralizing agent in accordance with my invention which will react with all of the residual sulfuric acid in the mixer. Neutralizing agents which are suitable in accordance with my invention are the acetates of magnesium and calcium, or compounds of these metals which will form the acetate or other lower fatty acid salt without imparting any undesirable acid when mixed with the acetic acid in the presoaking bath. Other suitable compounds are magnesium carbonate, calcium carbonate, or calcium hydroxide. It is preferred that the sulfate formed by the neutralizing agent be sufficiently soluble in water that it can be removed by the water washing of the cellulose ester which results. Thus the use of barium compounds as neutralizing agents would be less desirable than the neutralizing agents listed, because of the water insolubility of barium sulfate.

As an example of a process embodying my invention, after an esterification of cellulose such as described in Example I of my Patent No.

2,026,986 in which process the completed reaction mixture was poured from the esterification vessel, a mixture of 1,200 lbs. of acetic acid and 800 lbs. of propionic acid (or butyric acid or their mixture) containing ¼ lb. of magnesium carbonate was introduced into the mixer. As in a mixer of the size necessary in that example, the amount of dope which ordinarily sticks to the surfaces upon pouring out the solution is 25-50 lbs., the amount of magnesium carbonate prescribed will neutralize the sulfuric acid which is present with, as a rule, a slight excess of neutralizing agent.

400 lbs. of cellulose may then be introduced into the mixer and presoaked such as by maintaining the mass at 100° F. for four hours, which may be followed by esterification such as by a process in accordance with that described in my Patent No. 2,026,986.

Instead of making the mixed ester, my invention is also adapted to the making of high viscosity cellulose acetate. In that case, the presoaking is with acetic acid alone. In the making of high viscosity cellulose acetate or mixed ester, the esterification should be carried out with an appreciable amount of catalyst such as approximately 30 lbs. for 400 lbs. of cellulose to assure a rapid esterification at low temperature and thereby avoid excessive degradation of the cellulose. In the making high viscosity esters, the temperature is not allowed to rise to a maximum of more than 90° F. and preferably not more than 80° F. The cellulose esters, to the making of which my invention is particularly directed are those having an acetic acidtetrachlorethane viscosity of at least 100 secs. My invention, however, will be useful in any process for making lower fatty acid esters of cellulose where it is desirable that the cellulose be activated, and yet a pronounced reduction of the viscosity in either the activation or the esterification in undesirable.

I claim:

1. A method for preparing an acylation vessel, containing as a residue, some of the reaction mixture previously prepared therein in which a lower fatty acid ester of cellulose was prepared and sulfuric acid was employed as the catalyst, for a subsequent process for preparing a lower fatty acid ester of cellulose, which comprises treating the residue in the vessel with a lower fatty acid solution of a neutralizing agent which forms with the sulfuric acid a compound which is insoluble in glacial acetic acid, selected from the group consisting of magnesium and calcium acetates, and magnesium and calcium compounds which will form acetates when mixed with acetic acid.

2. A method for preparing a high viscosity acetyl cellulose in a used acylation vessel which contains some of the previous acetylation batch, which comprises treating the residue in the vessel with a liquid free of mineral acid but containing a lower fatty acid solution of a neutralizing agent which forms with the sulfuric acid present a compound insoluble in glacial acetic acid, selected from the group consisting of magnesium and calcium acetates, and magnesium and calcium compounds which will form acetates when mixed with acetic acid, pretreating cellulose having a high cuprammonium viscosity in this lower fatty acid and then acetylating the cellulose with an acetylation bath containing 5-10% of sulfuric acid based on the cellulose at a temperature not to exceed 90° F.

3. A method for preparing an acylation vessel, containing as a residue, some of the reaction mixture previously prepared therein in which a lower fatty acid ester of cellulose was prepared and sulfuric acid was employed as the catalyst, for a subsequent process for preparing a lower fatty acid ester of cellulose, which comprises treating the residue in the vessel with a lower fatty acid solution of magnesium carbonate in an amount slightly in excess of that necessary to neutralize the sulfuric acid therein.

4. A method for preparing an acylation vessel, containing as a residue, some of the reaction mixture previously prepared therein in which a lower fatty acid ester of cellulose was prepared and sulfuric acid was employed as the catalyst, for a subsequent process for preparing a lower fatty acid ester of cellulose, which comprises treating the residue in the vessel with a lower fatty acid solution of magnesium acetate in an amount slightly in excess of that necessary to neutralize the sulfuric acid therein.

5. A method for preparing an acylation vessel, containing as a residue, some of the reaction mixture previously prepared therein in which a lower fatty acid ester of cellulose was prepared and sulfuric acid was employed as the catalyst, for a subsequent process for preparing a lower fatty acid ester of cellulose, which comprises treating the residue in the vessel with a lower fatty acid solution of calcium acetate in an amount slightly in excess of that necessary to neutralize the sulfuric acid therein.

CARL J. MALM.